(12) United States Patent
Vilaseca et al.

(10) Patent No.: US 12,050,173 B2
(45) Date of Patent: Jul. 30, 2024

(54) SYSTEM AND DEVICE FOR SUBSTANCE DETECTION

(71) Applicant: Urugus S.A., Montevideo (UY)

(72) Inventors: David Vilaseca, Caba (AR); Gerardo Gabriel Richarte, Caba (AR)

(73) Assignee: Urugus S.A., Montevideo (UY)

( * ) Notice: Subject to any disclaimer, the term of this patent is extended or adjusted under 35 U.S.C. 154(b) by 382 days.

(21) Appl. No.: 17/603,213

(22) PCT Filed: Apr. 7, 2020

(86) PCT No.: PCT/US2020/027114
§ 371 (c)(1),
(2) Date: Oct. 12, 2021

(87) PCT Pub. No.: WO2020/210266
PCT Pub. Date: Oct. 15, 2020

(65) Prior Publication Data
US 2022/0196547 A1   Jun. 23, 2022

Related U.S. Application Data

(60) Provisional application No. 62/833,172, filed on Apr. 12, 2019.

(51) Int. Cl.
*G01N 21/3504* (2014.01)
*G01N 21/17* (2006.01)

(52) U.S. Cl.
CPC .  *G01N 21/3504* (2013.01); *G01N 2021/1795* (2013.01); *G01N 2201/0214* (2013.01)

(58) Field of Classification Search
CPC ....... G01N 21/3504; G01N 2021/1795; G01N 2201/0214; G01N 21/171; G01N 2021/1714
See application file for complete search history.

(56) References Cited

U.S. PATENT DOCUMENTS 6,750,453 B1   6/2004 Nelson
9,500,591 B1 * 11/2016 Goad ................. G01N 21/6486
(Continued)

FOREIGN PATENT DOCUMENTS

WO   2018035603 A1   3/2018

OTHER PUBLICATIONS

The International Report on Preliminary Patentability for PCT Application No. PCT/US20/27114, mailed Oct. 21, 2021.
(Continued)

*Primary Examiner* — David P Porta
*Assistant Examiner* — Meenakshi S Sahu
(74) *Attorney, Agent, or Firm* — Lee & Hayes, P.C.

(57) ABSTRACT

Systems, methods and devices to detect target substances in confined or open spaces, and from the ground or remote locations are disclosed. A system includes a radiation emission source and one or more transducers configured to detect target substances. The transducer to detect target substances includes a filter that allows various wavelengths of light to pass through while attenuates or reflects others; and one or more chambers disposed within the optical path of the filter. The transducer may also include electromagnetic radiation detectors to detect electromagnetic radiation at wavelengths different from the wavelengths transmitted by the filter. The systems, methods, and devices disclosed allow shifting the detection range of phenomena in which the detection/observation technology is not efficient to other detection ranges where detection can be optimized.

18 Claims, 9 Drawing Sheets

(56) References Cited

U.S. PATENT DOCUMENTS

2003/0000281 A1    1/2003   Ketler et al.
2013/0316395 A1   11/2013   Kinugasa
2016/0153834 A1    6/2016   Tidemand-Lichtenberg et al.

OTHER PUBLICATIONS

The PCT Search Report and Written Opinion mailed on Jul. 2, 2020 for PCT Application No. PCT/US2020/027114, 12 pages.
Extended European Search Report mailed Dec. 5, 2022, for European Patent Application No. 20787944.6, a foreign counterpart of U.S. Appl. No. 17/603,213, 7 pages.
Israeli Office Action mailed on Jan. 1, 2024, for Israeli Application No. 287167, a foreign counterpart of U.S. Appl. No. 17/603,213, 3 pages.
Kerrigan, et al., "Development of a lunar-source imaging GFCR for measurement of tropospheric carbon monoxide", Proceedings of Spie—International Society of Optical Engineering, vol. 4360, Jan. 1, 2003, pp. 682-689.
Decision to grant a European Patent mailed on Mar. 7, 2024 for European Application No. 20787944.6, a foreign counterpart of the U.S. Appl. No. 17/603,213, 2 pages.

\* cited by examiner

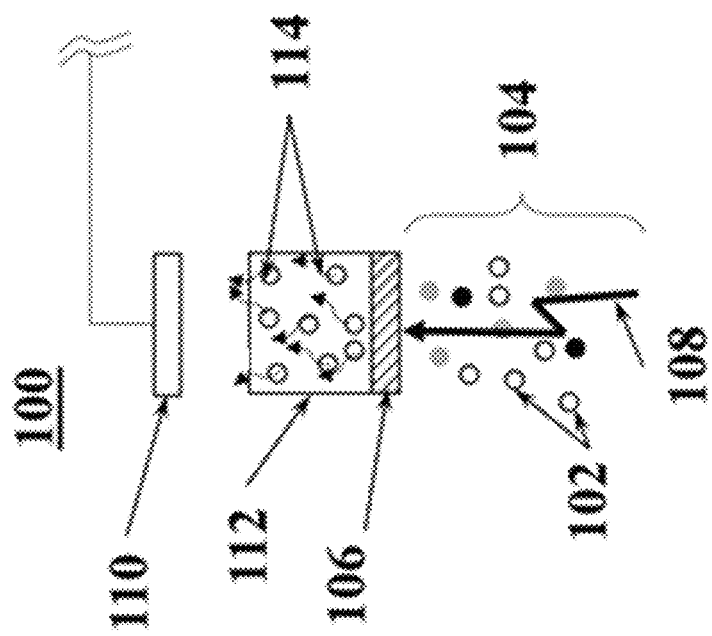
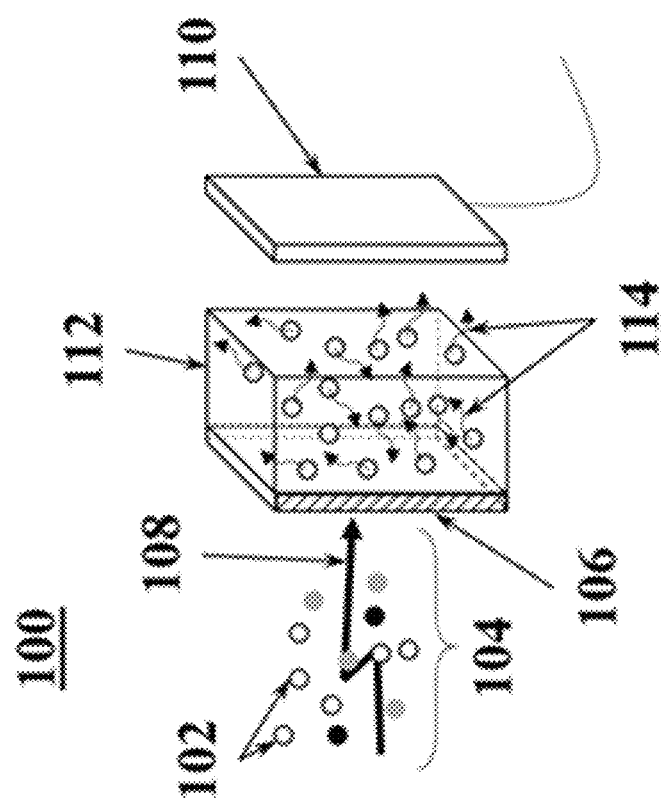
FIG. 1A
FIG. 1B

SYSTEM AND DEVICE FOR SUBSTANCE DETECTION

CROSS REFERENCE TO RELATED APPLICATIONS

This application is a US national stage entry of International Patent Application No. PCT/US20/27114, filed Apr. 7, 2020, which claims priority to U.S. Provisional Application No. 62/833,172, filed on Apr. 12, 2019, entitled "SYSTEM AND DEVICE FOR SUBSTANCE DETECTION", the entire contents of which are incorporated herein in their entirety by reference.

BACKGROUND

The detection of substances present in the atmosphere or in urban, rural and industrial environments, such as greenhouse gases, carbon monoxide emissions in confined spaces, and gases and particulates in fire smoke, is of paramount importance to understand and estimate beneficial or harmful consequences, in the short and long term. Several methods and devices have been developed to detect gases, however, state of the art solutions are focused in a few absorption bands of radiation of the gas to be detected, yielding bad signal-noise ratio (SNR) and low detection sensitivity. Many of the current solutions are fixed in the short-wave infrared (SWIR) spectrum, using expensive, noisy and restricted technology. There is still a need to have a robust method and device to detect and measure substances suitable for a variety of applications and designed to detect substances in different scenarios, extending from confined environments to open spaces.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 1A shows a perspective view of one example transducer employed to detect and quantify a target gas or substance in a target area.

FIG. 1B shows a side view of one example transducer employed to detect and quantify a target gas or substance in a target area.

DETAILED DESCRIPTION

Overview

Figure 2A:
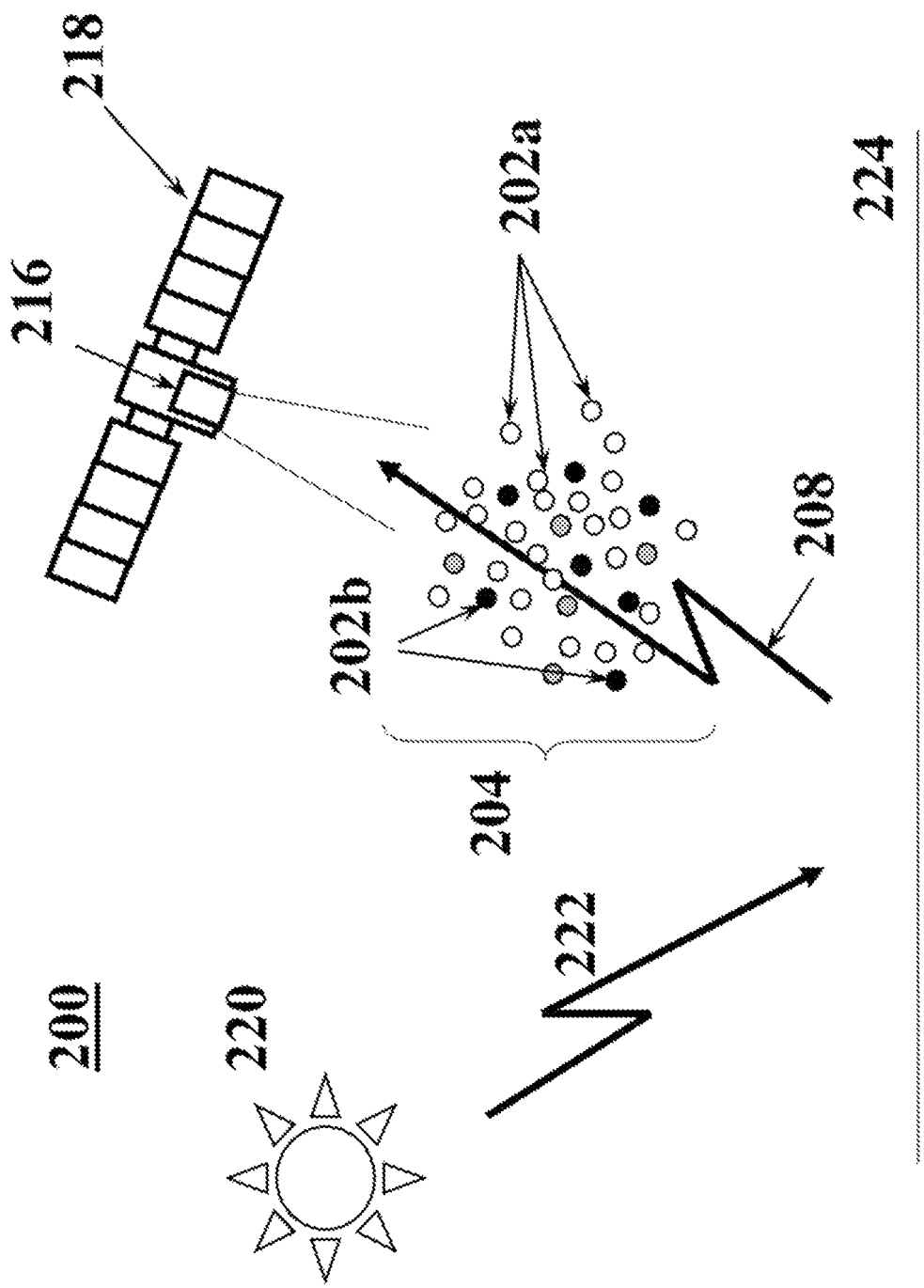
FIG. 2A shows an example system to detect target atmospheric gases such as methane and carbon dioxide from outer space.

Embodiments include novel systems, methods and devices to detect and measure substances in confined or open spaces, and from the ground or a remote location, such as from an aerial vehicle. Embodiments include a transducer to detect target substances, the transducer comprising: a filter configured to transmit electromagnetic radiation at preselected wavelengths; and one or more chambers. In some embodiments, the transducer further includes an electromagnetic radiation detector configured to detect electromagnetic radiation at wavelengths different from the preselected wavelengths transmitted by the filter.

One of the main benefits of the systems, methods, and devices herein disclosed includes the possibility of shifting the detection range of phenomena in which the detection/observation technology is not efficient to other detection ranges where detection can be optimized.

A target substance, as used herein, refers to a substance whose presence, concentration, spectral profile, and/or other distinctive parameter can be detected by the systems, methods and devices described in the embodiments. The substance may be in liquid, gaseous or solid state. Examples of a target substance may include water vapor ($H_2O$), carbon dioxide ($CO_2$), carbon monoxide (CO), methane ($CH_4$), nitrous oxide ($N_2O$), ozone ($O_3$), Chlorofluorocarbons (CFCs), Hydrofluorocarbons (incl. HCFCs and HFCs), minerals, fossils, precious metals, mineral specimens, liquids from pipelines for fluid leak detection, or any other substances which may be in the atmosphere, contained within particular limits, or confined in a closed or sealed space. In some instances, the substance in solid, liquid or gaseous state includes semi-transparent or translucent substances, and/or substances having spectral signatures with discriminating peaks (including characteristic spectral bands or lines).

As used herein, a filter refers to an optical filter that allows various wavelengths of light to pass through while the filter attenuates or reflects others. For example, an optical filter may contain one or more regions configured to selectively transmit electromagnetic radiation at wavelengths that include one or more characteristic absorption lines/bands of radiation of the target substance while the filter attenuates or reflects electromagnetic radiation wavelengths detectable by the electromagnetic radiation detector. The optical filter may be a bandpass filter having discrete regions of the filter that allow a high transmission across narrow bandwidths while attenuating unwanted light to maximize electromagnetic radiation detection at the required wavelengths. The unwanted light attenuated by the filter in many situations comprises the electromagnetic radiation wavelengths detectable by the electromagnetic radiation detector. One or more filters may be used to selectively attenuate and/or pass desired wavelengths to result in a spectral profile having one or more absorption lines or bands of radiation of the target substance.

Other examples of optical filters may be used with embodiments described herein and are contemplated herein as providing the features and benefits described. For instance, in some applications, the filter is configured to transmit electromagnetic radiation wavelengths in a single region of the electromagnetic spectrum, for example in a portion or all the visible-near infrared (VISNIR) region, the short-wave infrared (SWIR) region, or the mid-wave infrared (MWIR) region. In other instances, the filter is configured to transmit electromagnetic radiation at wavelengths in more than one region of the electromagnetic spectrum, including a spectral range that is continuous, or in discrete portions of the spectral range, or in some cases, may include very narrow and specific wavelengths, or ranges of wavelengths, for example the VISNIR+SWIR+MWIR regions, specific ranges of wavelengths within the VISNIR+SWIR+MWIR regions, or any combination of these regions.

As described herein, a chamber is a recipient or container that encases a predetermined concentration of the target substance, although in some instances it may be void or substantially void. In some instances, part or all of the chamber may be the target substance itself. The chamber may be a nanochamber, a microchamber or a macrochamber, depending on the overall size of the system or device containing it. For example, the chamber that encases the predetermined concentration of the substance may be a porous material which entraps the substance, or may be a tube or nanotube, such as a hollow optical fiber or a carbon nanotube, or may be a bubble or vesicle filled with the target substance. In some instances, the chamber may encase a substance in gaseous or solid state, whereas in other examples the chamber may be the substance in solid form. Other examples of chambers may be used with the embodiments described herein and are contemplated herein as providing the features and benefits described.

In some instances, the chamber is configured to allow the passage of electromagnetic radiation at wavelengths corresponding to one or more absorption lines and/or bands of radiation of the target substance and the target substance contained in the chamber is heated or excited by electromagnetic radiation entering the chamber. In turn, the heated particles of target substance inside the chamber emit electromagnetic radiation to be detected by the electromagnetic radiation detector. For this reason, the chamber is configured to maximize the passage or transmission of electromagnetic radiation at the wavelengths detectable by the electromagnetic radiation detector towards the electromagnetic radiation detector, and minimize the transmission of this radiation towards other directions. To achieve this, the chamber may use filters, transparent windows, reflecting surfaces or optical properties of the chamber itself. Other examples providing the features and benefits described may be used.

In some embodiments, the systems or devices described herein include more than one chamber, and all chambers may contain the same predetermined concentration of target substance. Also, when there is more than one chamber, each chamber may have a predetermined concentration different from another chamber, different target substances, different densities, or a combination of these, such as different concentrations and target substances.

In some implementations, the electromagnetic radiation detector comprises a single detector element such as a thermal infrared detector, a pixel sensor, a microbolometer, or a long-wave infrared (LWIR) detector, while in other implementations, the electromagnetic radiation detector may be an array of detector elements, such as a bidimensional or lineal array, of the same or different type of detector elements. Examples include light-absorbing detectors arranged in a two-dimensional array such as a charge coupled device (CCD), complementary metal oxide semiconductor (CMOS) sensor, or other suitable architecture. Although other examples of electromagnetic radiation detectors and arrangements are possible without departing from the scope of embodiments described or claimed herein. In some embodiments, when there is more than one chamber, the electromagnetic radiation detector may comprise more than one detector element.

In some embodiments, the transducer further comprises a second filter configured to attenuate electromagnetic radiation at the preselected wavelengths transmitted by the at least one filter. The benefit of including a second filter is appreciable when there is a need to optimize the signal-to-noise ratio. In some instances, the second filter is configured to transmit electromagnetic radiation of wavelengths in a spectral range that is continuous, or in discrete portions of the spectral range, or in some cases, may include very narrow and specific wavelengths, or ranges of wavelengths, for example in the long-wave infrared (LWIR) range of the electromagnetic spectrum.

Embodiments also include systems, such as ground, aerial or satellite-based systems, to detect target substances comprising means for collecting electromagnetic radiation to obtain collected electromagnetic radiation; and one or more transducers configured to detect target substances. The transducer may comprise one or more optical filters configured to transmit the collected electromagnetic radiation at wavelengths including one or more characteristic absorption lines or bands of radiation (spectral lines) of the target substance; and one or more chambers disposed within the optical path of said one or more optical filters. Some chambers may be configured to emit electromagnetic radiation at wavelengths different from the range of wavelengths transmitted by the one or more optical filters. In some embodiments, the transducer may further comprise one or more electromagnetic radiation detector elements configured to detect electromagnetic radiation wavelengths, such as radiation attenuated by the optical filter and/or emitted by some of the chambers. In some instances, the systems may further include a control module configured to form an image or video based on the information provided by the transducer and/or detector elements. The information may be in the form of electromagnetic radiation emitted at wavelengths different from the preselected wavelengths. In some examples, the electromagnetic radiation emitted at wavelengths different from the preselected wavelengths is the radiation detected by the one or more electromagnetic radiation detector elements, or the radiation emitted by the one or more chambers.

Some chambers may contain a reference amount of the target substance and other chambers may be void. Also, the amount of target gas or substance or the type of gas or substance may be the same in all chambers or may be different. For example, if a system is used to detect carbon dioxide and methane, a preselected number of chambers may contain carbon dioxide at different concentrations and another number of chambers may contain methane at different concentrations.

In some embodiments, the transducer further comprising means for optimizing the collection of electromagnetic radiation to obtain collected electromagnetic radiation including one or more absorption lines and/or bands of radiation of the target substance; and means for reducing interference to the collected electromagnetic radiation including one or more absorption lines and/or bands of radiation of the target substance.

The electromagnetic radiation collected by the transducer contains not only information directly related to the target substance in the target area but also additional information which interferes with the main detection in the target area and is not related to the target substance. As used herein, the term "main detection" refers to the collected electromagnetic radiation including one or more absorption lines and/or bands of radiation of the target substance and "interference detection" refers to collected electromagnetic radiation which includes absorption bands/lines of radiation from substances other than the target substance. This interference may be constant but may also vary depending on several factors. Accordingly, in some embodiments, the systems or devices described herein may further include means for minimizing or reducing the interference to the main detection. The interference may be due to, for example, cloudiness, the properties and characteristics of the background, the angle of incidence of light as a result of the sun elevation (e.g. latitude), the time of the day, the seasons of the year, the concentration of particles in the air (e.g. dust), the intrinsic variability of a radiation source, and other sources of variability not explicitly mentioned but known in the art. The background refers in general to the background of the target area which may include any absorbing, refracting or reflecting surface affecting the target area. For example, in embodiments in which the transducer is on-board an aircraft, a drone or a spacecraft, the target area may be a column of air including the target substance and the background may be the surface of the Earth, which may influence differently the detection of a target substance in the column of air depending on whether the surface of the Earth below the column of air is covered with plants, water or rocks.

In some instances, the means for minimizing or reducing the interference to the main detection may include any of the following: at least one chamber filled with a mixture of substances (e.g. gases) different from the target substance (e.g. gas); at least one chamber with one or more walls partially or completely covered by a substance capable of absorbing all electromagnetic radiation wavelengths transmitted by the filter and emitting electromagnetic radiation detectable by the detectors e.g. radiation wavelengths different from the radiation wavelengths transmitted by the filter; or the presence of one at least one sensor or electromagnetic radiation detector(s). The additional sensor or detector may be configured to detect the radiation spectrum collected by the transducer (before or after being filtered), including the radiation spectrum related to both the target substance in the target area and the interference, and use this information to calibrate the system or device, to subtract the interference. In some instances, the same beam of electromagnetic radiation is collected by the system or device, and a beam splitter is used to direct a portion of the beam to the transducer, and another portion to the additional sensor. The additional sensor may be of the same type as the electromagnetic radiation detector, or may be an imaging sensor of an imaging device such as a camera, a panchromatic camera, a multispectral camera, a hyperspectral camera, a shortwave infrared camera, a near infrared camera, or any combination of them.

In some embodiments, the system further comprises an electromagnetic radiation source or a radiation emission source. The electromagnetic radiation source is an artificial electromagnetic radiation source which emits radiation at particular and discrete wavelengths, such as multiple laser sources emitting at some or all the absorption lines (bands) of radiation of the target substance. In other embodiments, the electromagnetic radiation source is a natural radiation emission source, such as the sun, which behaves as a blackbody radiation source and emits electromagnetic radiation within a range of wavelengths containing the absorption lines (i.e. spectral lines) of the target substance.

Some embodiments of the detection systems and devices described herein may be employed to detect target substances from an aerial vehicle, such as an aircraft, a spacecraft, a drone, a plane, a satellite which may be a low-earth orbit satellite, an unmanned aerial vehicle (UAV) or a similar vehicle flying over the Earth or any other celestial body or object. In some instances, the electromagnetic radiation source emits radiation from Earth and is collected by the device on-board the aerial vehicle. In other examples, the sun acting as the electromagnetic radiation source emits radiation towards the Earth and it is the radiation reflected by the surface of the Earth, the main amount of radiation that is collected by the device on-board the aerial vehicle. Radiation emitted by the sun, without being reflected by the Earth, may also be collected by the device. Also in other examples, the radiation source may be on-board the aerial vehicle, emit radiation towards the Earth and collect the radiation after being reflected by the surface of the Earth. In some situations, the radiated radiation is collected by the device.

According to some embodiments, the devices and systems to detect target substances may be part of a stationary platform, such as a ground-based detecting system, or may be part of a moveable platform, such as an aircraft, an UAV or a satellite in a Low Earth orbit (LEO). In some instances, the platform is not designed to move during the substance detection, while in other implementations, the platform is in motion during the substance detection. If the platform is on-board an aerial vehicle, it can be stationary and move with the motion of the aerial vehicle, or it can move with a stabilizing system, such as the one disclosed in US Pat. Pub. No. 2015/0326769 to appear still in relation to the movement of the aerial vehicle.

Some embodiments of the systems and devices described herein may be employed to detect substances in an open space such as the atmosphere, or may be employed to detect substances contained in a confined space. Whereas most of the following examples refers to gas detection it is to be understood that other substances in liquid, gaseous or solid state may be detected, and changes to the embodiments may be made without departing from the scope of the disclosure.

The methods, systems and devices described herein may be implemented in a number of ways. Example implementations are described herein to aid in illustration, although those examples are not meant to be taken in a limiting sense.

FIG. 1A shows a perspective view and FIG. 1B shows a side view of an example transducer 100 employed to detect and quantify a target gas or substance 102 in a target area 104. The transducer 100 collects electromagnetic radiation 108 that traversed the target area 104 containing the target gas or substance 102. The transducer 100 may collect electromagnetic radiation 108 by using an optical instrument configured to gather electromagnetic radiation such as a lens or a telescope. The transducer 100 further comprises an optical filter 106 configured to transmit one or more ranges of wavelengths from the electromagnetic radiation 108 containing part or all the absorption spectrum of the target gas or substance 102. The optical filter 106 may also be configured to attenuate, absorb or reflect other ranges of the electromagnetic radiation spectrum which are detected by the detector 110 comprising for example a microbolometer, a thermal camera or an MCT (HgCdTe) photodetector. In some cases, the range of wavelengths transmitted by the optical filter 106 is in the visible-near infrared (VISNIR) range, or in the short-wave infrared (SWIR), or in mid-wave infrared (MWIR) range. Depending of the gas or substance, any combination of these or other ranges can also be employed. The transducer 100 further comprises a chamber 112 containing a known amount of the target gas or substance 102 which is used to "amplify" the absorption spectrum signal characteristic of the target gas or substance 102 contained in the electromagnetic radiation 108 collected by the transducer 100 and subsequently filtered by the optical filter 106.

The electromagnetic radiation 108 is correlated to the concentration of the gas or substance present in the target area 104. After passing through the optical filter 106, the electromagnetic radiation 108 enters the chamber 112 containing a high concentration of target gas or substance 102, and excites the particles contained in the chamber 112. In some embodiments, the high concentration of target gas or substance inside the chamber is a predetermined concentration which is set as a value above a predefined threshold which is usually related to the sensitivity of the instrument.

If there is a high concentration of particles of the target gas or substance 102 in the target area 104, the amount of radiation energy absorbed by particles in the target area 104 is also high, consequently the amount of radiation energy available to be absorbed by the particles at the chamber 112 is low. On the contrary, if there is a low concentration of the target gas or substance 102 particles in the target area 104, the amount of radiation energy absorbed by particles in the target area 104 is also low, and the radiation energy available to be absorbed by the particles at the chamber 112 is high.

Once the particles inside the chamber 112 absorb the energy of the electromagnetic radiation 108 attenuated by the particles of the gas or substance 102 in the target area 104, heat is generated. The generated thermal energy also emits a characteristic radiation wavelength 114, which is detected by the detector 110. The chamber 112 is configured to direct the radiation wavelength 114 towards the detector 110. The only available path for the radiation wavelength 114 is towards the detector 110, since the radiation wavelength 114 cannot pass through the optical filter 106 and cannot not escape from the chamber 112 in a direction different than towards the detector 110. The radiation wavelength 114 is usually in the long-wave infrared (LWIR) region of the electromagnetic spectrum. The transducer 100 may be used to detect the presence of a gas or substance 102, or it may be possible to calculate the concentration of the gas or substance 102, since the amount of radiated energy at radiation wavelength 114 detected by the detector 110 is related to concentration of the gas or substance 102 in the target area 104.

Some embodiments of the systems and devices described herein may be employed to detect gases in the atmosphere from an aerial vehicle and may also be used to determine the concentration of the gas in the atmosphere. In other embodiments, the system elements or devices may be all or partially ground-based or on-board the aerial vehicle. FIG. 2A shows an example system 200 that may be employed to detect target atmospheric gases, for example methane 202a and carbon dioxide 202b, from outer space. The system 200 includes an apparatus 216 to detect gases on-board a satellite 218. In this example, the sun 220, acting as an electromagnetic radiation source, emits solar radiation 222 towards the Earth 224, and after interacting with the surface of the Earth 224, the backscattered solar radiation 208 is collected by the apparatus 216 after passing through the atmospheric path 204, which in some cases may include more than one atmospheric layer. On its path, the backscattered solar radiation 208 interacts with methane 202a, carbon dioxide 202b, and other different gases and substances in the atmosphere. This interaction includes the absorption of radiation at characteristic radiation wavelengths, determined by the atomic and molecular composition of the target gases. The backscattered solar radiation 208, containing the absorption spectral information of the methane 202a and the carbon dioxide 202b, is collected, detected and measured by the apparatus 216.

Apart from collecting backscattered solar radiation 208 reflected by the surface of the Earth, the apparatus 216 may also collect solar radiation 222 directly emitted from the sun that passed through the target area and interacted with the target atmospheric gases. Also, in other examples the electromagnetic radiation collected by the apparatus may be electromagnetic radiation reflected by any surface in outer space or electromagnetic radiation that interacted with the target substance confined or contained in a target area. For example, an apparatus or transducer as described herein on-board a satellite may detect gases emitted by a spacecraft (target gases) in outer space by first emitting electromagnetic radiation towards the spacecraft, and then collecting and transducing 1) the emitted electromagnetic radiation that passed through the target gases and interacted with the target gases, 2) the emitted electromagnetic radiation that interacted with the gases after being reflected by the spacecraft, 3) or a combination of both.

Figure 2B:
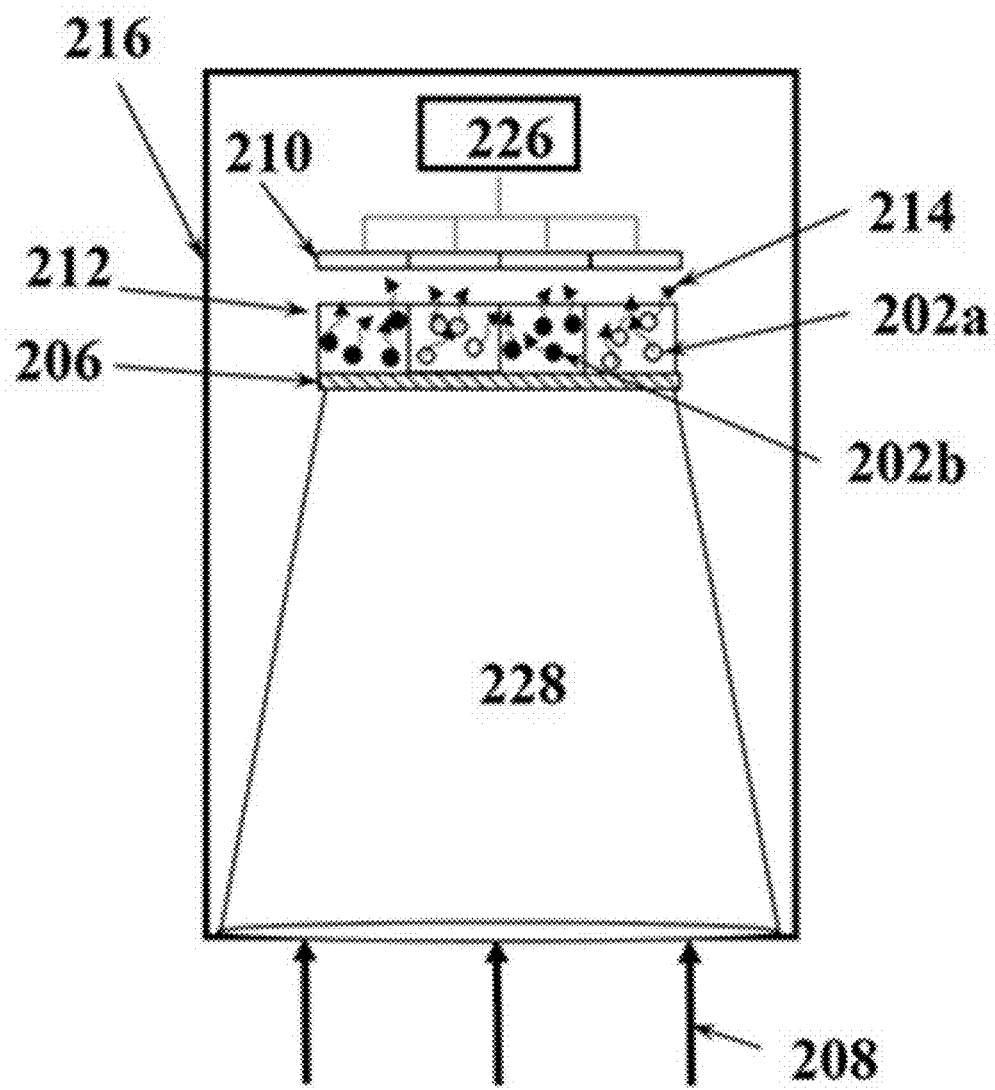
FIG. 2B illustrates a side view of an example apparatus on-board the satellite to detect target atmospheric gases from outer space.

FIG. 2B illustrates a side view of an example apparatus 216 on-board the satellite 218 which may include a filter 206, such as an interferometric or absorption filter, that transmits all wavelengths except the LWIR range, a plurality of microchambers 212, and a detector array 210 comprising a plurality of pixel sensors in a unidimensional or bidimensional arrangement. The detector array 210 may be connected to a control module 226 which calculates the concentration of methane 202a and carbon dioxide 202b in the atmospheric path. The control module may be all or partially on-board the satellite. In some instances, the control module may be ground-based with such ground-based control module in communication with the satellite that includes the remaining parts of the apparatus, such as the transducer and detectors.

The control module may further form an image or video based on the information provided by the detector array 210 showing, for example, a two-dimensional distribution of methane 202a and carbon dioxide 202b contained in the atmospheric path. The control module 226 may form an image using the information provided by the detector array comprising a plurality of pixel sensors, placed in front of the microchambers. In some instances, the size of the microchamber is the size of the pixel sensor and the radiation emitted by each chamber is associated with each pixel sensor, i.e. the substance's presence or concentration is a function of the pixel sensor's position on the detector array. Also, a bidimensional image may be formed because both the microchambers and the pixel sensors arrays have a bidimensional arrangement. Alternatively, a bidimensional image may be formed using microchambers and pixel sensors in a unidimensional arrangement, but configured to scan the target area with the motion of the aerial vehicle, the motion of the focal plane (e.g. using motors), the motion of the optical system (e.g. using mirrors or lenses), or any combination of them. In this manner, a gas or substance is detected from different areas of the target area as the aerial vehicle flies forward, points in a different direction, moves the focal plane perpendicular to the line sensor, or moves the optical system in front of the sensor in such a way as to project different parts of the target area into the sensor. Also, in satellite or spacecraft embodiments, the system 200 may further comprise means 228 to optimize the collection of radiation 208, such as a lens, a telescope or any other optical instrument configured to gather and/or focus electromagnetic radiation.

Figure 2C:
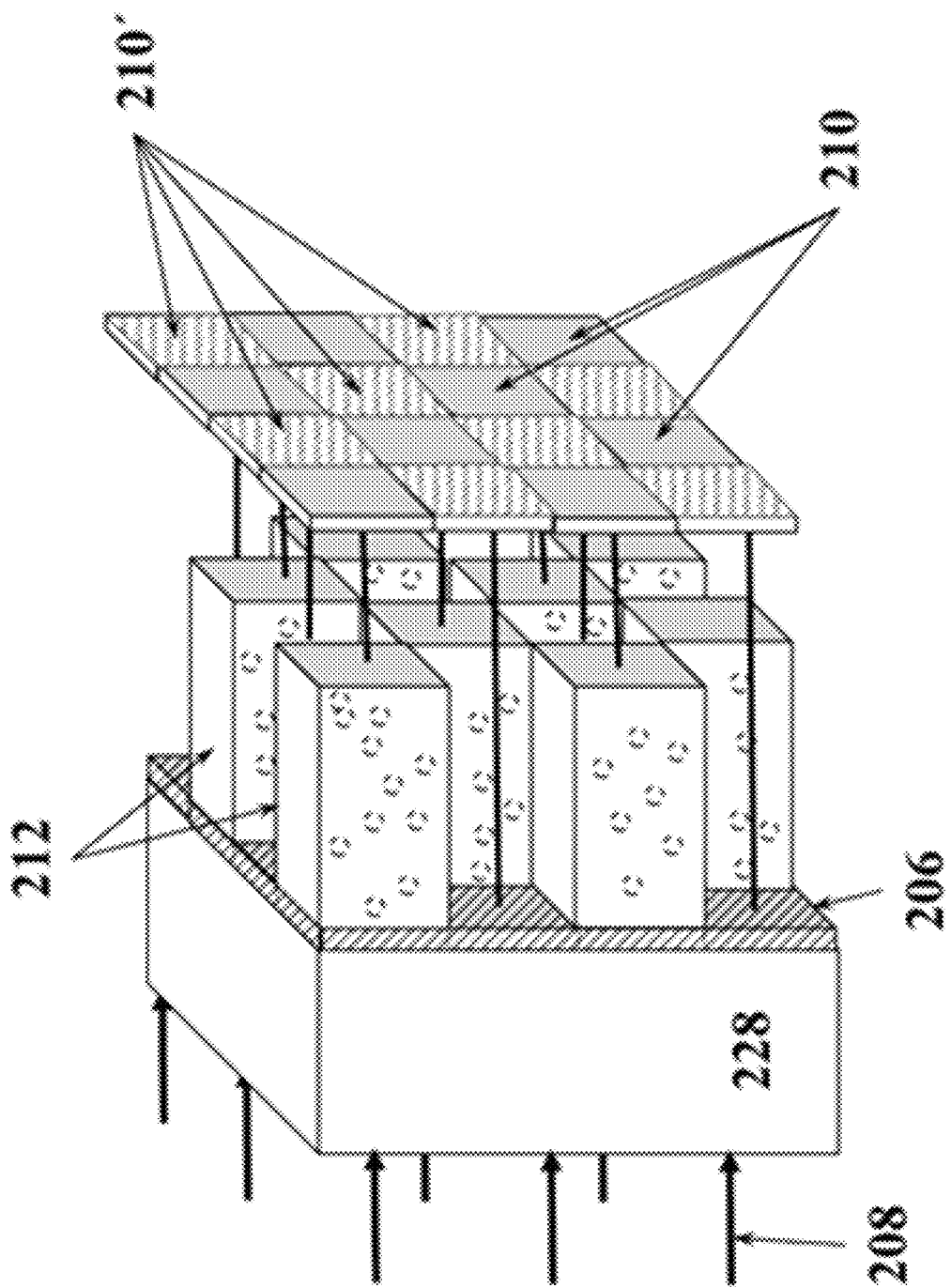
FIG. 2C illustrates an example of the system including additional means to calibrate the apparatus that detects the target gases.

FIG. 2C shows an example of the system 200 further comprising additional means to calibrate the apparatus 216 including a calibrating array 210' having a plurality of pixel sensors wherein each pixel sensor is placed next to a pixel sensor of the detector array 210. In this example, the size of the microchamber is the size of the pixel sensor of the detector array 210 and each microchamber of the plurality of microchambers 212, is placed in the optical path between the filter 206 and each pixel sensor of the detector array 210. In this configuration, the pixel sensor of the calibrating array 210' directly detects the radiation 208 after passing only through the filter 206, whereas each pixel sensor of the detector array 210 receives the radiation 208 after passing through the filter 206 and the microchambers 212. In this manner, the radiation emitted by each microchamber is associated with each pixel sensor of the detector array 210, and the radiation 208 is associated with each pixel sensor of the calibrating array 210'. The control module may further use the information provided by the calibrating array 210' to subtract the influence of the background to the main detection.

Figure 3A:
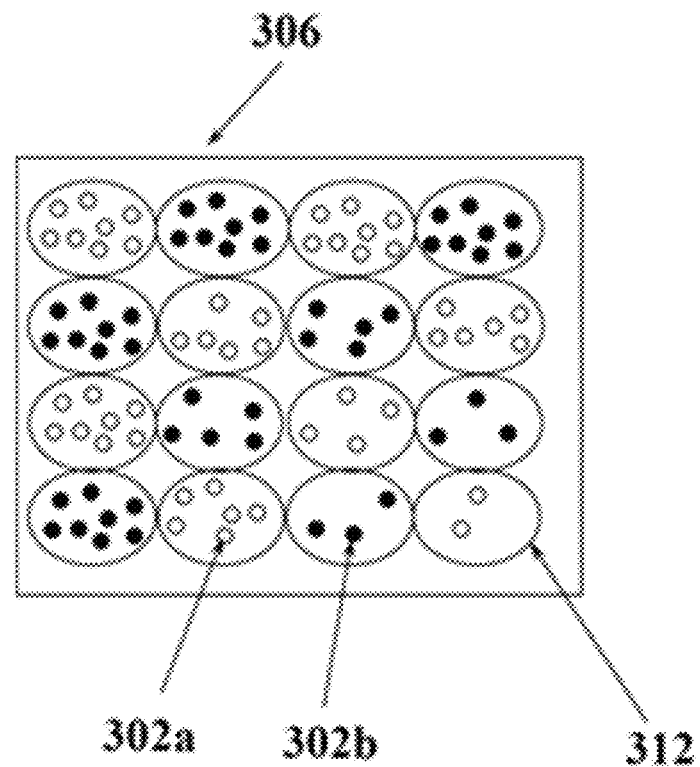
FIG. 3A shows an example of a bidimensional arrangement of microchambers including droplets of a polymeric material transparent to wavelengths in the long-wave infrared/thermal infrared (LWIR/TIR) region.
Figure 3B:
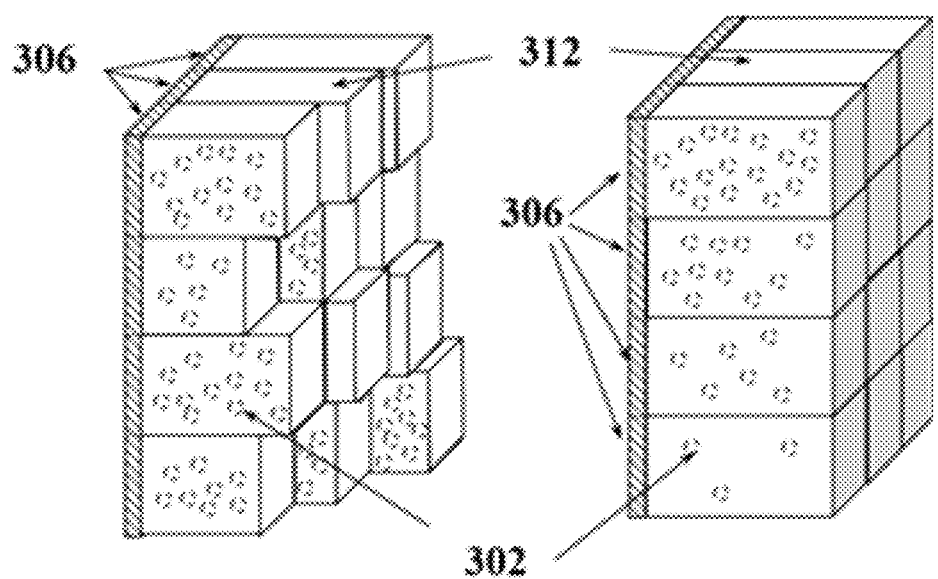
FIG. 3B shows other examples of microchambers' arrays positioned over the surface of a filter array.

Each microchamber may contain different concentrations of the target gas. FIG. 3A shows an example of a bidimensional arrangement of microchambers including droplets 312 of a polymeric material transparent to wavelengths in the LWIR/TIR region. Each droplet 312 may contain different predetermined concentrations of methane 302a and carbon dioxide 302b. The microchambers may be placed on the optical filter 306. FIG. 3B shows other examples of microchambers' arrays positioned over the surface of a filter array 306 and having cells 312 of different or similar sizes, and each containing a different or the same concentration of the target gas 302. Also, in examples for detecting solid substances, part or all of each microchamber may be the target substance itself, all having the same or different densities.

Figure 4:
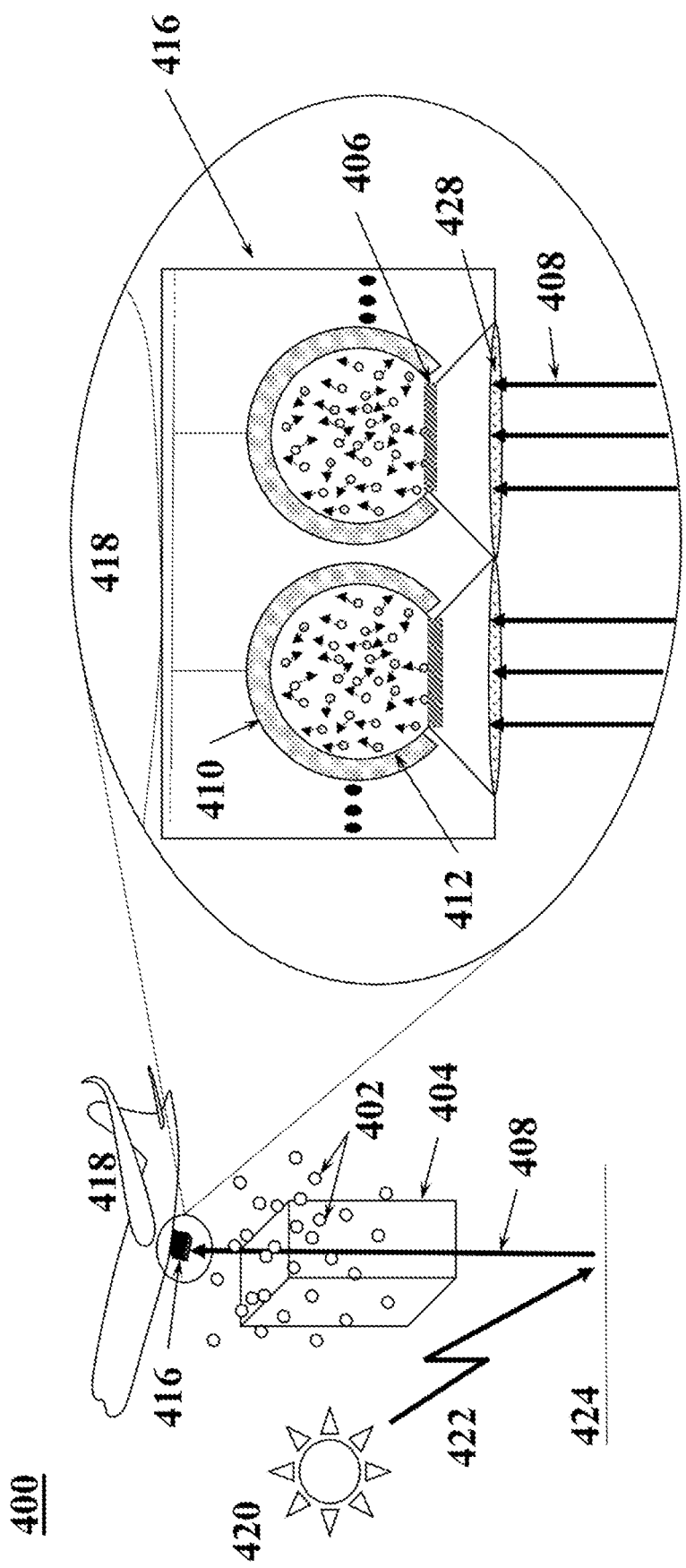
FIG. 4 illustrates another embodiment of a system and device to detect and quantify the concentration of a gas or substance in the atmosphere from an aerial vehicle.

Some embodiments of the systems, methods and devices described herein may be used to detect and quantify gases and substances in the atmosphere from a remote location, through atmospheric observations. Embodiments also include systems, methods and devices for the simultaneous or sequential detection and measurement of a plurality of elements, such as elements in gaseous mixture, using a sample of the gas or element to be detected, as the best possible specimen to filter light in its characteristic spectral lines. FIG. 4 illustrates another embodiment of a system and device to detect and quantify the concentration of a gas or substance in the atmosphere from an aerial vehicle. The system 400 comprises a transducer 416 on-board an aircraft 418 having a field of view oriented towards a column of air 404 in the atmosphere. The sun 420 emits solar radiation 422 while the aircraft 418 flies over the column of air 404 containing an unknown concentration of methane particles 402. The solar radiation 422 reflected by the surface of the Earth 424 passes through the column of air 404 containing the unknown concentration of methane particles 402 which can be homogeneously or heterogeneously distributed in the column of air 404. When the reflected radiation 408 passes through the column of air 404, it may interact with the methane particles 402 present in the atmosphere and the energy of the reflected radiation 408 may be absorbed or transmitted. The portion of reflected radiation 408 which was absorbed by the methane particles 402 while traversing the column of air 404 is lost in the atmosphere and reduces the amount of radiation energy collected by the transducer 416 at the absorption bands of the methane particles 402. This relationship serves to determine the unknown concentration of methane particles 402.

While the aircraft 418 flies over the column of air 404, the reflected radiation 408 is collected by the transducer 416. The transducer 416 may include a plurality of cells 412 each containing a predetermined amount of gas. Each cell also has a lens 428 to optimize the collection of reflected radiation 408 and a filter 406, to allow the transmission of wavelengths containing all or some of the absorption bands of methane particles 402. The transducer 416 may also include thermal detectors 410 configured to collect radiation energy in the LWIR range.

The reflected radiation 408, after being reflected by the surface of the Earth 424 and interacting with the methane particles 402 within the column of air 404, passes through the filters 406 into the cells 412 and the filtered radiation passing through the cells 412 excite the amount of gas inside each cell in a proportion related to the amount of energy present in the gas' absorption bands.

In some embodiments, the filters 406 may transmit all wavelengths in the VISNIR, SWIR and MWIR ranges of the electromagnetic spectrum while attenuating wavelengths in the LWIR range. All filters may be configured to transmit and attenuate wavelengths within the same range, whereas in other implementations each filter may be configured to transmit and attenuate wavelengths in one or more ranges different from the other filters.

Each cell 412 contains a predetermined concentration of methane particles 402, and upon striking the methane particles 402 inside the cells 412, the photons that match the energy gap of the molecules present inside the cells 412 are absorbed and excite the molecules. The energy absorbed by methane particles 402 inside the cells 412 increases the vibration of methane molecules and increases the temperature of the gas inside the cells 412. This results in the generation of electromagnetic radiation detected by thermal detectors 410. The shape or position of the thermal detectors 410 may be arranged in a manner that increases the detection sensitivity, for example encapsulating the cells 412 with the thermal detectors 410, or forming the walls of the cells.

The cells 412 may have one or more walls or surfaces that allow the transmission of wavelengths that passed the filters 406, and one or more walls or surfaces that allow the transmission of wavelengths detected by thermal detectors 410. For example, the filters 406 apart from filtering the incoming radiation 408, may act as one of the walls of the cells 412 transmitting wavelengths in the VISNIR, SWIR and MWIR ranges. Additionally, the cells 412 may also have one or more walls that allow the transmission of wavelengths in the LWIR range. Also, in some instances, the cells 412 may have one or more internal reflective walls to keep the wavelengths transmitted by the filter 406 inside the cells 412 to interact with the methane particles 402 while at the same time allow the transmission of wavelengths in the LWIR range to be detected by the thermal detectors 410.

The system 400 may further include a control module configured to determine the concentration of methane particles 402 in the atmosphere. Still in further embodiments, the control module may be configured to create an image or a video with the information obtained from the transducer 416.

Figure 5:
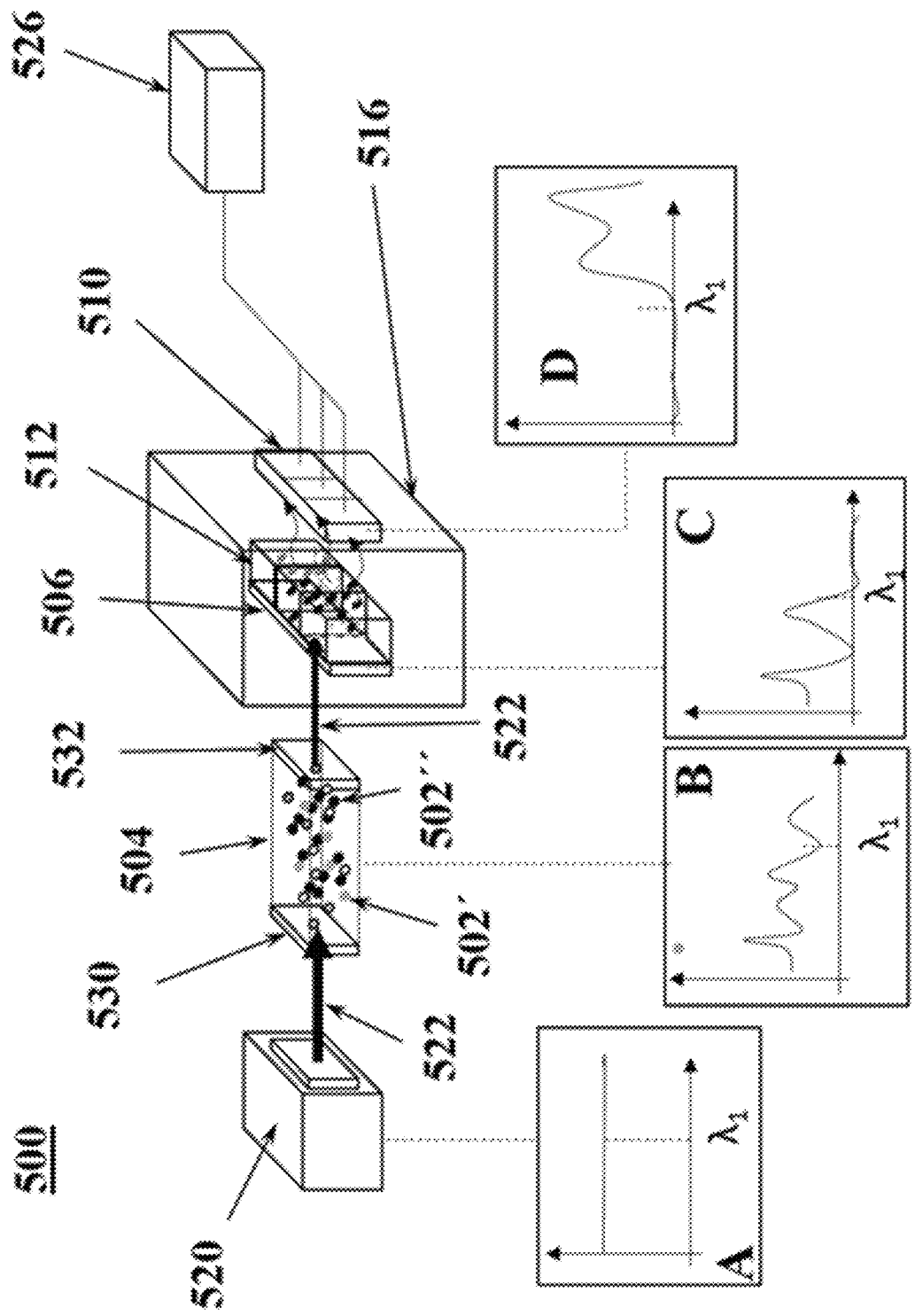
FIG. 5 shows an example of a system comprising a transducer being used in a laboratory to detect and measure the concentration of two gases.

FIG. 5 shows an example of the system 500 comprising a transducer 516 being used in a laboratory to detect and measure the concentration of two gases. This example can be extended to the detection of more gases. An artificial electromagnetic radiation source 520 (also referred to herein as a "radiation emission source 520", or a "radiation source 520") is directed to the sample cell 504 containing a mixture of gases including the two gases 502' and 502" whose concentrations are unknown. The sample cell 504 has windows 530 and 532 that allow the radiation 522 that is emitted by the radiation source 520 to pass through the mixture of gases inside the sample cell 504. The radiation 522 includes a broad range of wavelengths as shown in A of FIG. 5. When the radiation 522 passes through the sample cell 504, it is selectively absorbed or transmitted after interacting with all the gas particles inside the sample cell 504. This interaction produces an attenuation of the radiation 522 at the absorption bands of radiation characteristic of all the gas particles present in the sample cell 504, as shown in B of FIG. 5. The radiation 522, attenuated by the interaction with the gas particles inside the sample cell 504, is collected by the transducer 516, and filter 506 filters the radiation 522 transmitting only the spectral lines of the two gases 502' and 502", and reflecting or absorbing all wavelengths above $\lambda_1$ and other ranges including the absorption bands of other gases inside the sample cell 504, as shown in C of FIG. 5. In other instances, the filter 506 may transmit all wavelengths below $\lambda_1$, including the absorption bands of the two gases 502' and 502" and the absorption bands of other gases inside the sample cell 504, and reflect all wavelengths above $\lambda_1$.

The filtered radiation enters the chambers 512. One of the chambers may contain a high concentration of the gas particles 502', another of the chambers may contain a high concentration of the gas particles 502", and another chamber may be void with its internal walls painted with a paint that absorbs all wavelengths below $\lambda_1$, e.g. black. The void and painted chamber may be used to reduce or minimize the interference due to the presence of other gases in the sample cell 504 or the intrinsic variability of the radiation source 520, since it may provide information to subtract from the information related to the absorption bands of the gases provided by the chambers 512 filled with gases 502' and 502". In other embodiments, more gases could be detected, increasing the number of chambers containing the gas to be detected and including one or more black chambers used as reference.

Upon striking the gas particles 502' and 502" inside the chambers 512, the photons that match the energy gap of the molecules are absorbed in order to excite the molecules at radiation wavelengths corresponding to the absorption spectrum of the gases. The energy absorbed by particles of gases 502' and 502" inside the chambers 512 increases the vibration of the molecules and increases the temperature of the gases. This results in the generation of electromagnetic radiation emitted away from chambers 512. The temperature determines the wavelength distribution and amount of energy of the electromagnetic radiation which, after leaving the chambers 512, are detected by the thermal infrared detectors 510 which allows the transmission of electromagnetic radiation above $\lambda_1$, as shown in D of FIG. 5.

Also, upon striking the walls of the one or more void chambers 512 painted with black paint, the photons are absorbed and generate electromagnetic radiation which may be also detected by the thermal infrared detectors 510. In some cases, the thermal infrared detectors 510 detect electromagnetic radiation sequentially, alternating between electromagnetic radiation emitted by the chambers 512 filled with gases 502' and 502" and the electromagnetic radiation emitted by the chambers 512 that are void and painted with black.

The system 500 may further include a control module 526 which processes the information provided by the thermal infrared detectors 510. In some instances, the control module 526 is able to differentiate between the gas particles 502' and 502" based on their characteristic spectral profiles above $\lambda_1$, detected by the thermal infrared detectors 510. In other embodiments, each thermal infrared detector 510 detects electromagnetic radiation from each chamber 512, and the control module 526 may process information from each thermal infrared detector 510. In other instances, if there is a single thermal infrared detector for all chambers which can detect electromagnetic radiation simultaneously from all chambers, the control module 526 may correlate the detected electromagnetic radiation from different regions of the thermal infrared detector with the signal provided by the chambers, each containing a different type of gas. Still in other embodiments, if there is one thermal infrared detector 510, the thermal infrared detector 510 may be placed in front of each chamber, sequentially, for example by means of an alternating mechanism, and the control module 526 may independently obtain information from the detected electromagnetic radiation from each chamber. The control module 526 may further process the information provided by reference chambers, e.g. the void and/or painted chambers to reduce or minimize the interference to the main detection.

Embodiments include a method to detect the presence or concentration of one or more target gases or substances in a target area, which can be a confined environment or an open space, such as the atmosphere. The method comprises the step of collecting electromagnetic radiation including a first electromagnetic radiation range of electromagnetic radiation passing through the target area including one or more target gases or substances. The first electromagnetic radiation range includes one or more absorption bands of radiation of the target gas or substance, which may be selected using filters. The first electromagnetic radiation range may comprise a continuous spectral range, or may comprise broad or narrow portions of spectral range.

The method further includes the step of transducing the energy of the first electromagnetic radiation range into a second electromagnetic radiation range, wherein the first electromagnetic radiation range is different from the second electromagnetic radiation range. This step may be performed by shifting the detection range from one electromagnetic spectrum range to another, advantageously allowing to shift the detection range from a range in which the detection is poor or difficult, to a detection range in which the detection can be optimized for a given application, for example instead of detecting in the SWIR, the detection range is shifted to the thermal infrared (TIR).

There are several methods that may be used to shift the spectral range. In some embodiments, the energy of the first electromagnetic radiation range is transduced or shifted into a second electromagnetic radiation range by exciting a preselected amount of one or more target substances with the energy of the first electromagnetic radiation range. The absorbed energy causes an increase of the molecules' vibration motion which is liberated by emitting electromagnetic radiation whose spectrum depends on the generated temperature. Thus, the energy of the first electromagnetic radiation, after being absorbed by the preselected amount of the reference gas or substance, emits the second electromagnetic radiation range due to the increase in temperature. In some instances, the one or more target substances may be mixed with gases or substances different from the target gases or substances.

In some embodiments, the method includes the multispectral retrieval of gas or substance information by collecting electromagnetic radiation comprising the absorption bands of radiation (i.e. characteristic spectral bands) of a target gas or substance in the VISNIR, SWIR and/or MWIR ranges of the electromagnetic radiation spectrum, and the transduction of the detected electromagnetic radiation energy in the VISNIR, SWIR and/or MWIR ranges into electromagnetic radiation energy in the LWIR range, through thermal excitation. The method may further include the step of detecting the second electromagnetic radiation range to extract information and determine the presence or concentration of the target gas or substance.

In some embodiments, the method further includes reducing or minimizing potential interference to the information related to the target substance in the atmosphere (main detection) by subtracting information of the electromagnetic radiation passing through the target area which is not related to the target substance (interference detection) but whose spectral information is collected and/or detected along with the main detection. In some instances, the method includes subtracting the interference present in the target area due to several factors such as gases different from the target gas or surface reflection (Earth or celestial body or object), by collecting electromagnetic radiation comprising a radiation spectrum containing both the interference and main detection, transducing the radiation spectrums to corresponding radiation spectrums i.e. interference radiation spectrum and main detection radiation spectrum, and subtracting the interference radiation spectrum from the main detection spectrum. Other examples include measuring radiation spectrums to characterize the thermal emission of the instrument, to be able to subtract the influence of this emission which does not relate to the concentration of the gas or substance of interest.

In some instances, the method further comprises reducing potential interference to information contained in the collected electromagnetic radiation by subtracting information from the collected electromagnetic radiation different from the first electromagnetic radiation range related to the one or more target substances in the target area using at least one of at least one chamber filled with a mixture of substances different from the target substance; at least one chamber with one or more walls partially or completely covered by a substance capable of absorbing the collected electromagnetic radiation and emitting electromagnetic radiation detectable by one or more detectors; or at least one sensor or electromagnetic radiation detector configured to detect the collected electromagnetic radiation.

Figure 6:
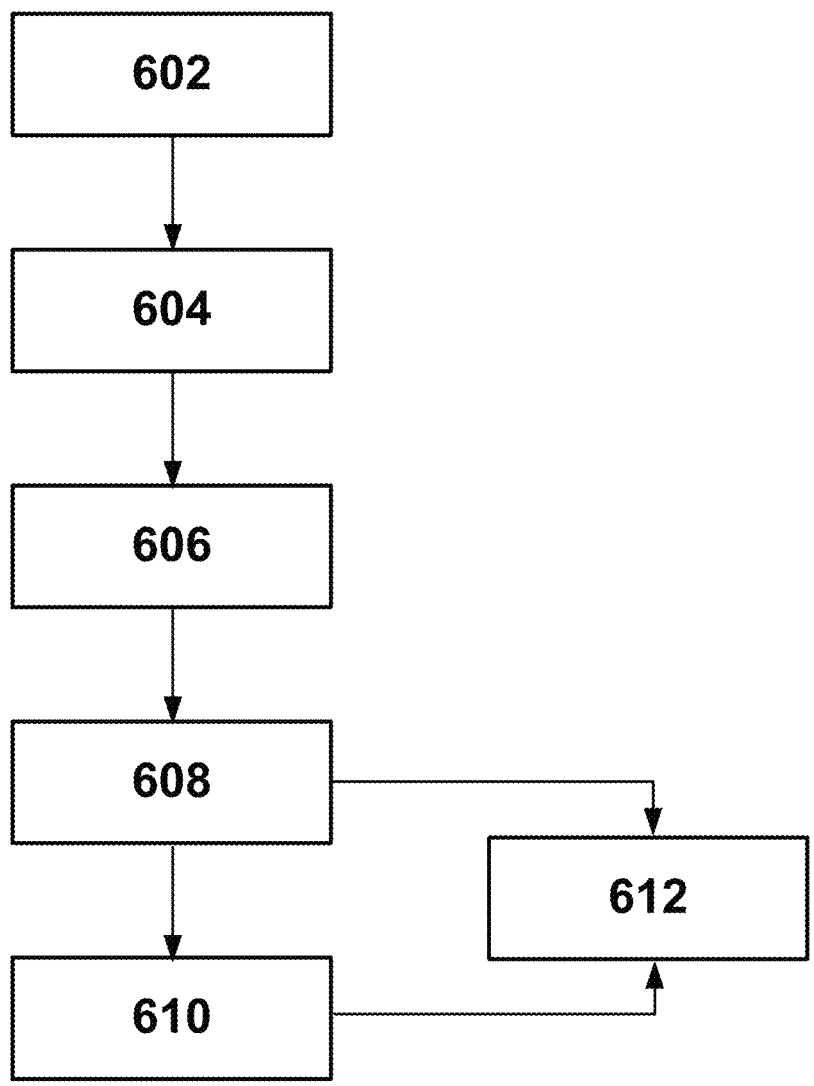
FIG. 6 depicts a flow graph that shows an example method for determining the presence or concentration of a target gas or substance in a target area.

FIG. 6 depicts a flow graph that shows an example method 600 in accordance with various embodiments for determining the presence or concentration of a target gas or substance in a target area. The detection may be performed from a mobile platform such as a manned or unmanned aerial vehicle or from a ground-based site. The steps of the method are illustrated in individual blocks and summarized with reference to those blocks. The steps are illustrated as logical flow graphs, each step of which may represent a set of steps that can be implemented in hardware, software, or a combination thereof. The order in which the steps are described is not intended to be construed as a limitation, and any number of the described steps can be combined in any order, separated into sub-steps, and/or performed in parallel to implement the method. Methods according to various embodiments of the present disclosure may include only some or all of the steps depicted in the logical flow graph.

At 602, electromagnetic radiation emitted by a natural or artificial electromagnetic source which passes through the target area including the target gas or substance is collected, for example by a transducer. The electromagnetic radiation may directly traverse the target area after being emitted by the source or it may be reflected by one or more surfaces before traversing the target area including the target gas or substance. The target gas may be confined in a sample cell or may be distributed in the atmosphere i.e. the target area. At 604, the electromagnetic radiation is filtered to transmit radiation wavelengths including all or some absorption bands of the absorption spectral profile of the target gas or substance. At 606, the filtered electromagnetic radiation excites a reference gas or substance. In general, the reference gas or substance is equal to the target gas or substance, but in a different concentration. The reference gas or substance may also be a mixture of gases or substances comprising the target gas or substance. At 608, the electromagnetic radiation emitted by the excited reference gas or substance is detected. Given that the electromagnetic radiation that passed through the target area interacted with the particles of target gas or substance in the target area, and the extent of this interaction is related to concentration of the target gas or substance in the target area, in some embodiments, at 610 a control module of a device or system to detect gases and substances may determine the concentration of the target gas or substance in the target area. At 612, an imaging module may process the information obtained from the steps 608 or 610 to generate an image of the spatial distribution of the target gas or substance in the target area.

In some embodiments, the method comprises the step of collecting electromagnetic radiation passing through the target area including one or more target gases or substances; filtering the electromagnetic radiation to transmit radiation wavelengths having an absorption spectral profile of the target gas or substance; activating a reference gas or substance with the filtered electromagnetic radiation; and detecting the electromagnetic radiation emitted from the reference gas or substance to determine for example, the presence or concentration of the target gas or substance. In some embodiments, the method further includes the step of transmitting all electromagnetic radiation emitted from the reference gas or substance and attenuating, absorbing or reflecting the electromagnetic radiation having the absorption spectral profile of the target gas or substance.

Figure 7:
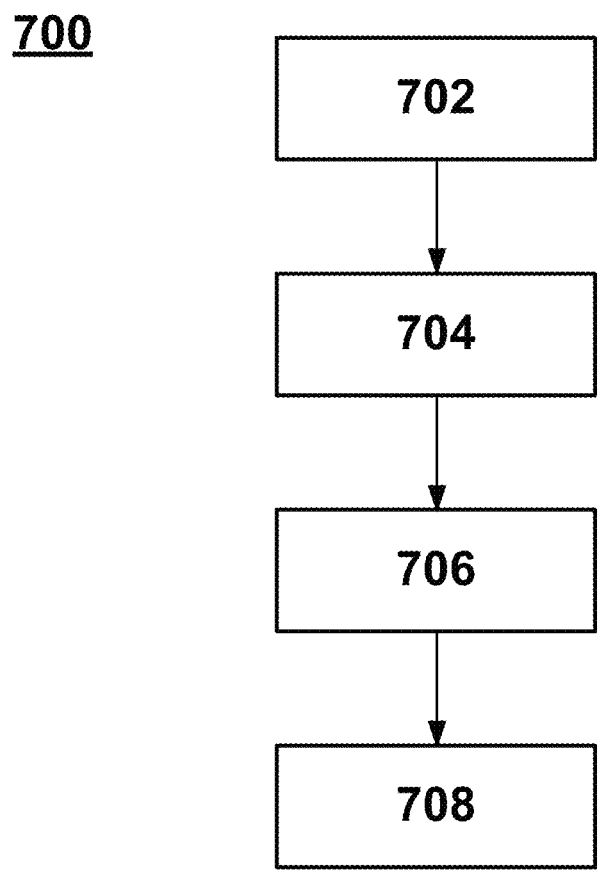
FIG. 7 depicts a flow graph that shows an example process for calibrating a device to detect and quantify a target gas or substance in a target area.

FIG. 7 is a flow diagram showing an example process 700 for calibrating the device to detect and quantify a target gas or substance in a target area. At 702, a preselected range of electromagnetic radiation wavelengths is directed towards the device, by a direct or indirect electromagnetic radiation source. At 704, the device collects and filters the preselected range of radiation wavelengths. At 706, the filtered radiation excites the reference substance inside the chambers, the chambers are disposed within the optical path of the filter. The reference substance inside the chamber comprises one or more target substances, a mixture of substances other than the target substances, or a combination of both. At 708, the radiation detectors detect the electromagnetic radiation emitted by the excited particles and the control module relates the information provided by the detected electromagnetic radiation with the concentration of the gas inside the chambers. In some embodiments all chambers may contain the same gas, and in other implementations the chambers may contain different gases. Also, in some instances the chambers may contain the same amount of gas, whereas in other cases the amount of gas may be different. Additionally, the chambers may be configured to act as a reference which can be used to reduce the interference or variability of the reflected electromagnetic radiation in the final measurement. For example, the chambers may be void and/or include internal walls painted with a paint absorbing electromagnetic radiation. Any combination of the above implementations is also possible.

Conclusion

Although the disclosure uses language that is specific to structural features and/or methodological acts, the invention is not limited to the specific features or acts described. Rather, the specific features and acts are disclosed as illustrative forms of implementing the invention.

What is claimed is:

1. A transducer for detecting a target substance, the transducer comprising:
   one or more first filters configured to transmit electromagnetic radiation at preselected wavelengths, the preselected wavelengths including one or more absorption bands of radiation of the target substance, to obtain filtered electromagnetic radiation; and
   one or more chambers disposed within an optical path of the one or more first filters;
   wherein the one or more chambers are configured to transmit or emit electromagnetic radiation at wavelengths different from the preselected wavelengths; and
   wherein the one or more first filters are configured to transmit one or more ranges of radiation wavelengths selected from the group consisting of the visible-near infrared (VISNIR) region, the short-wave infrared (SWIR) region, the mid-wave infrared (MWIR) region, and any combinations of these.

2. The transducer according to claim 1, wherein the one or more chambers are void or encase a predetermined concentration of the target substance; wherein the predetermined concentration in each of the one or more chambers that encase a predetermined concentration of the target substance is above a predefined threshold determined by a sensitivity for the target substance to be detected.

3. The transducer according to claim 1, further comprising:
   an electromagnetic radiation detector comprising a single detector element or an array of detector elements of the same or different type of detector elements, the electromagnetic radiation detector configured to detect electromagnetic radiation at the wavelengths different from the preselected wavelengths of the filtered electromagnetic radiation;
   wherein the one or more first filters are further adapted to attenuate or reflect electromagnetic radiation at wavelengths detectable by the electromagnetic radiation detector.

4. The transducer according to claim 3, wherein the electromagnetic radiation detector comprises a thermal infrared detector, a pixel sensor, a microbolometer, or a long-wave infrared (LWIR) detector.

5. The transducer according to claim 3, further comprising a second filter disposed between the one or more chambers and the electromagnetic radiation detector; the second filter configured to attenuate the filtered electromagnetic radiation, or transmit electromagnetic radiation at wavelengths in the long-wave infrared (LWIR) range of the electromagnetic spectrum.

6. The transducer according to claim 1, further comprising:
   means for collecting the electromagnetic radiation traversing a target space to obtain collected electromagnetic radiation, the target space containing the target substance; and
   means for reducing interference to the collected electromagnetic radiation;
   wherein the means for reducing interference comprises at least one of:
      at least one chamber filled with a mixture of substances different from the target substance;
      at least one chamber with one or more walls partially or completely covered by a substance capable of absorbing the preselected wavelengths transmitted by the one or more first filters and emitting electromagnetic radiation detectable by one or more detectors; or
      at least one sensor or electromagnetic radiation detector configured to detect a radiation spectrum collected by the transducer before or after the one or more first filters transmits the collected electromagnetic radiation at the preselected wavelengths.

7. The transducer according to claim 1, further comprising a control module configured to form an image or video based at least in part on information provided by electromagnetic radiation transmitted or emitted by the one or more chambers at the wavelengths different from the preselected wavelengths.

8. The transducer according to claim 1, wherein all or part of the transducer is on-board an aerial vehicle or is ground-based, and wherein the aerial vehicle is selected from the group consisting of an aircraft, a spacecraft, a drone, a plane, an unmanned aerial vehicle (UAV), and a satellite.

9. A method to calibrate the transducer of claim 1, comprising the steps of:
   directing a preselected range of electromagnetic radiation wavelengths towards the transducer;
   collecting, by the transducer, the preselected range of electromagnetic radiation wavelengths;
   filtering the preselected range of electromagnetic radiation wavelengths to obtain filtered electromagnetic radiation wavelengths;
   exciting a reference substance with the filtered electromagnetic radiation wavelengths to obtain an excited reference substance;
   detecting electromagnetic radiation emitted by the excited reference substance to obtain detected electromagnetic radiation; and
   correlating information provided by the detected electromagnetic radiation with a concentration of the target substance.

10. A system to detect a target substance comprising:
    a moveable platform; and
    a transducer disposed on the moveable platform, the transducer comprising:
       one or more first filters configured to transmit electromagnetic radiation at wavelengths including one or more absorption bands of radiation of the target substance; and
       one or more chambers disposed within an optical path of the one or more first filters, the one or more chambers configured to transmit or emit electromagnetic radiation at wavelengths different from the wavelengths transmitted by the one or more first filters;

wherein the transducer further comprises one or more electromagnetic radiation detector elements configured to detect electromagnetic radiation wavelengths; and wherein the moveable platform is an aerial vehicle selected from the group consisting of an aircraft, a spacecraft, a drone, a plane, an unmanned aerial vehicle (UAV), and a satellite.

11. The system according to claim 10, further comprising a control module configured to form an image or video based at least in part on information provided by electromagnetic radiation transmitted or emitted by the one or more chambers at the wavelengths different from the wavelengths transmitted by the one or more first filters.

12. The system according to claim 10, further comprising:
means for collecting the electromagnetic radiation traversing a target space to obtain collected electromagnetic radiation, the target space containing the target substance; and means for reducing interference to the collected electromagnetic radiation, the collected electromagnetic radiation including the one or more absorption bands of radiation of the target substance, wherein the interference includes at least one of a degree of cloudiness, properties and characteristics of a background of the target space, an angle of incidence of light, a time of the day, seasons of the year, a concentration of particles in the target space, or an intrinsic variability of a radiation emission source.

13. The system according to claim 10, wherein the electromagnetic radiation at the wavelengths including one or more absorption bands of radiation of the target substance is within a range selected from the group consisting of the visible-near infrared (VISNIR) region, the short-wave infrared (SWIR) region, the mid-wave infrared (MWIR) region, and combinations of these.

14. The system according to claim 10, further comprising a second filter configured to transmit radiation wavelengths emitted by the one or more chambers and attenuate the wavelengths transmitted by the one or more first filters; and/or wherein the second filter is configured to transmit electromagnetic radiation of wavelengths in the long-wave infrared (LWIR) or thermal infrared (TIR) region of the electromagnetic spectrum.

15. A method to detect the presence of one or more target substances in a target space, the method comprising:
collecting electromagnetic radiation including a first electromagnetic radiation range of electromagnetic radiation passing through the target space including the one or more target substances; and transducing energy of the first electromagnetic radiation range into a second electromagnetic radiation range;

wherein the first electromagnetic radiation range is different from the second electromagnetic radiation range, and the second electromagnetic radiation range is in the long-wave infrared (LWIR) region of the electromagnetic spectrum.

16. The method according to claim 15, wherein the first electromagnetic radiation range is selected from the group consisting of the visible-near infrared (VISNIR) region, the short-wave infrared (SWIR) region, the mid-wave infrared (MWIR) region, and combinations of these.

17. The method according to claim 15, further comprising detecting the second electromagnetic radiation range to extract information, determine a presence or concentration of the one or more target substances, and form an image or video.

18. The method according to claim 15, further comprising reducing potential interference to information contained in the collected electromagnetic radiation by subtracting at least some of the information from the collected electromagnetic radiation different from the first electromagnetic radiation range related to the one or more target substances in the target space using at least one of:
at least one chamber filled with a mixture of substances different from the one or more target substances;

at least one chamber with one or more walls partially or completely covered by a substance capable of absorbing the collected electromagnetic radiation and emitting electromagnetic radiation detectable by one or more detectors; or at least one sensor or electromagnetic radiation detector configured to detect the collected electromagnetic radiation.

\* \* \* \* \*